May 8, 1945.　　C. D. LAKE ET AL　　2,375,307
RECORD CONTROLLED MACHINE
Filed Dec. 24, 1941　　8 Sheets-Sheet 1

INVENTORS
BY
ATTORNEY

May 8, 1945.   C. D. LAKE ET AL   2,375,307
RECORD CONTROLLED MACHINE
Filed Dec. 24, 1941   8 Sheets-Sheet 2
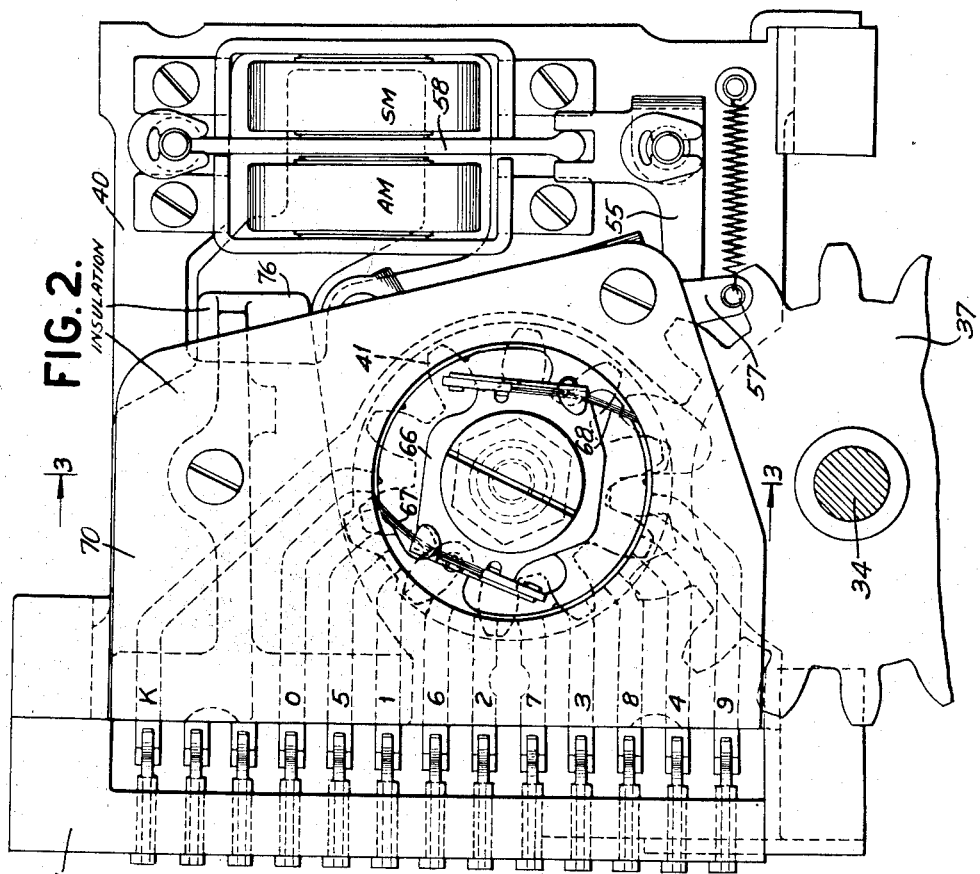
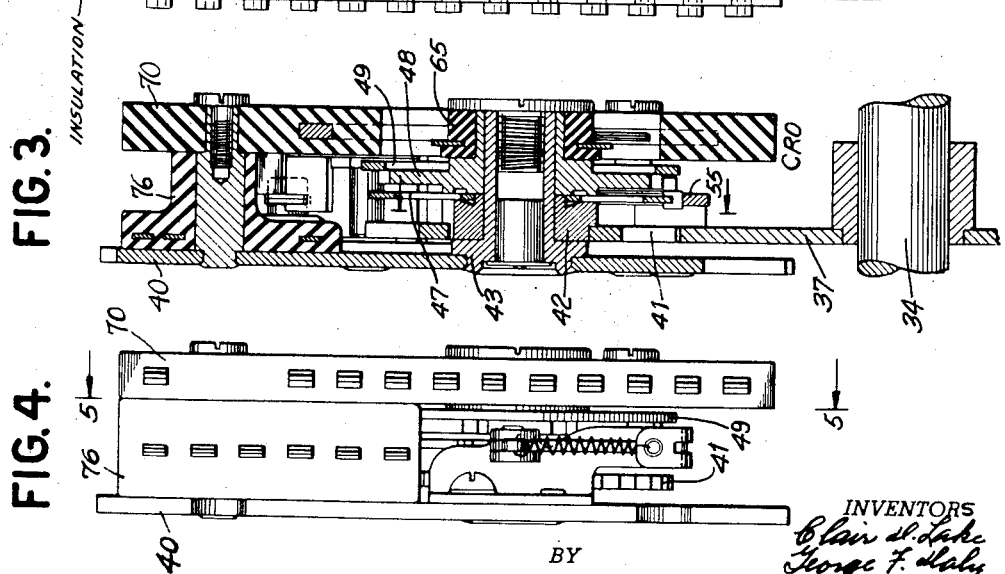
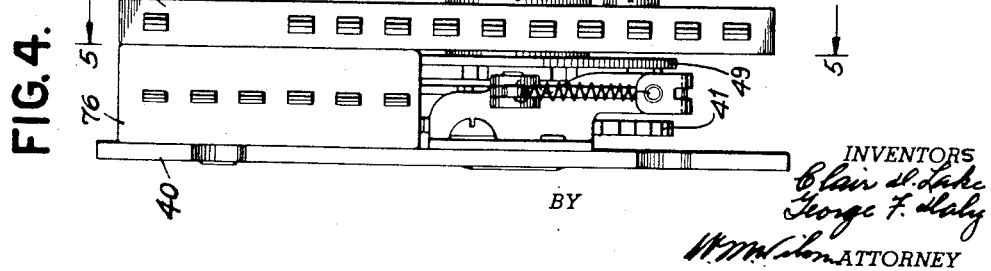

May 8, 1945.  C. D. LAKE ET AL  2,375,307
RECORD CONTROLLED MACHINE
Filed Dec. 24, 1941    8 Sheets-Sheet 3
FIG. 5.
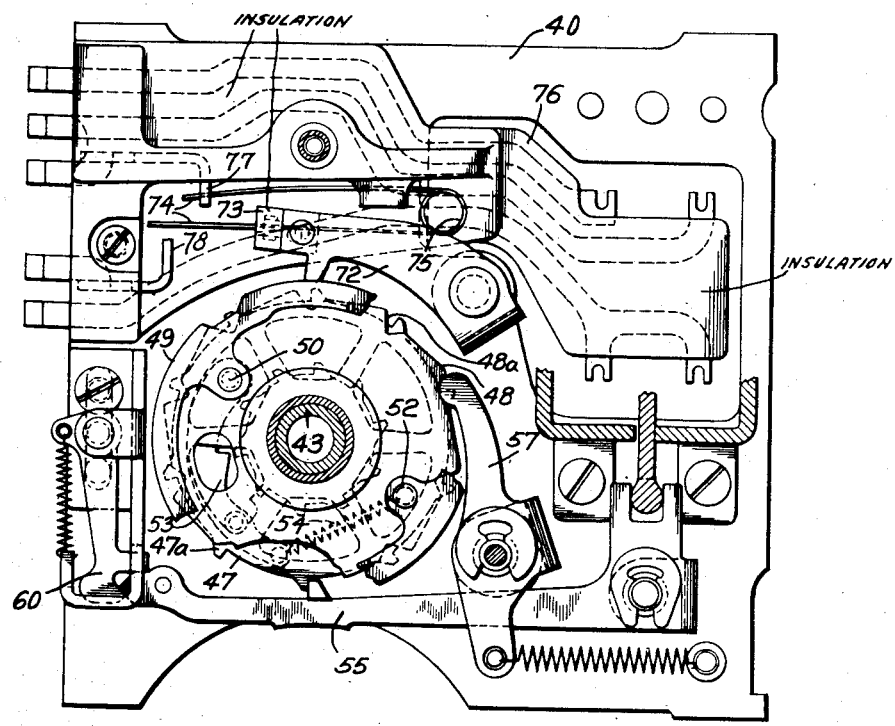
FIG. 6.
FIG. 7.
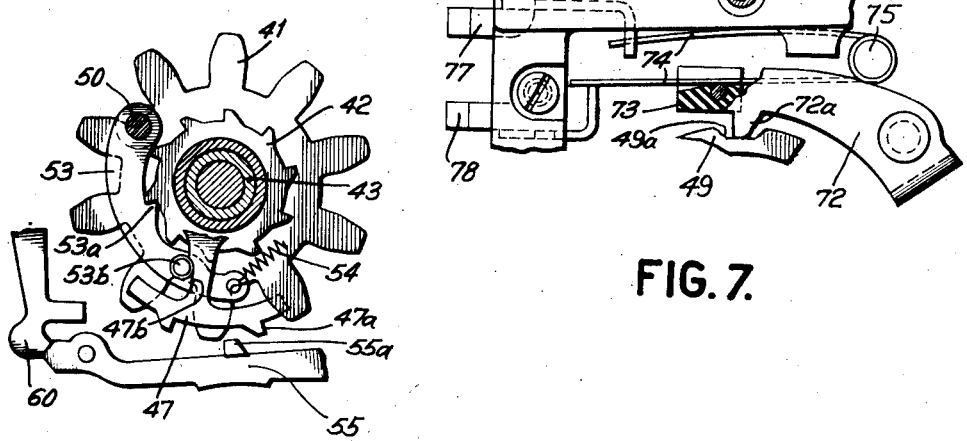
INVENTORS
Clair D. Lake
George F. Daly
BY
W. M. Wilson  ATTORNEY

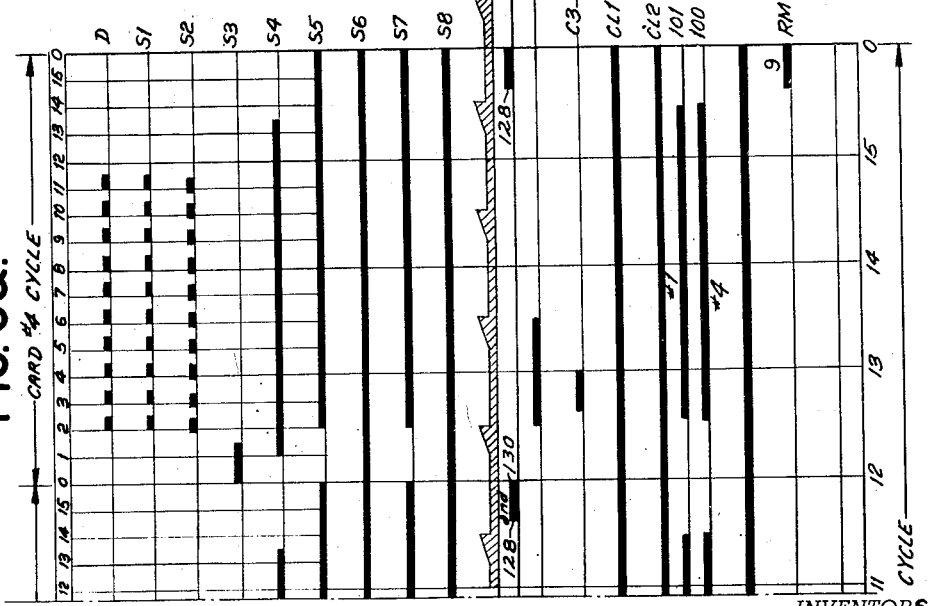

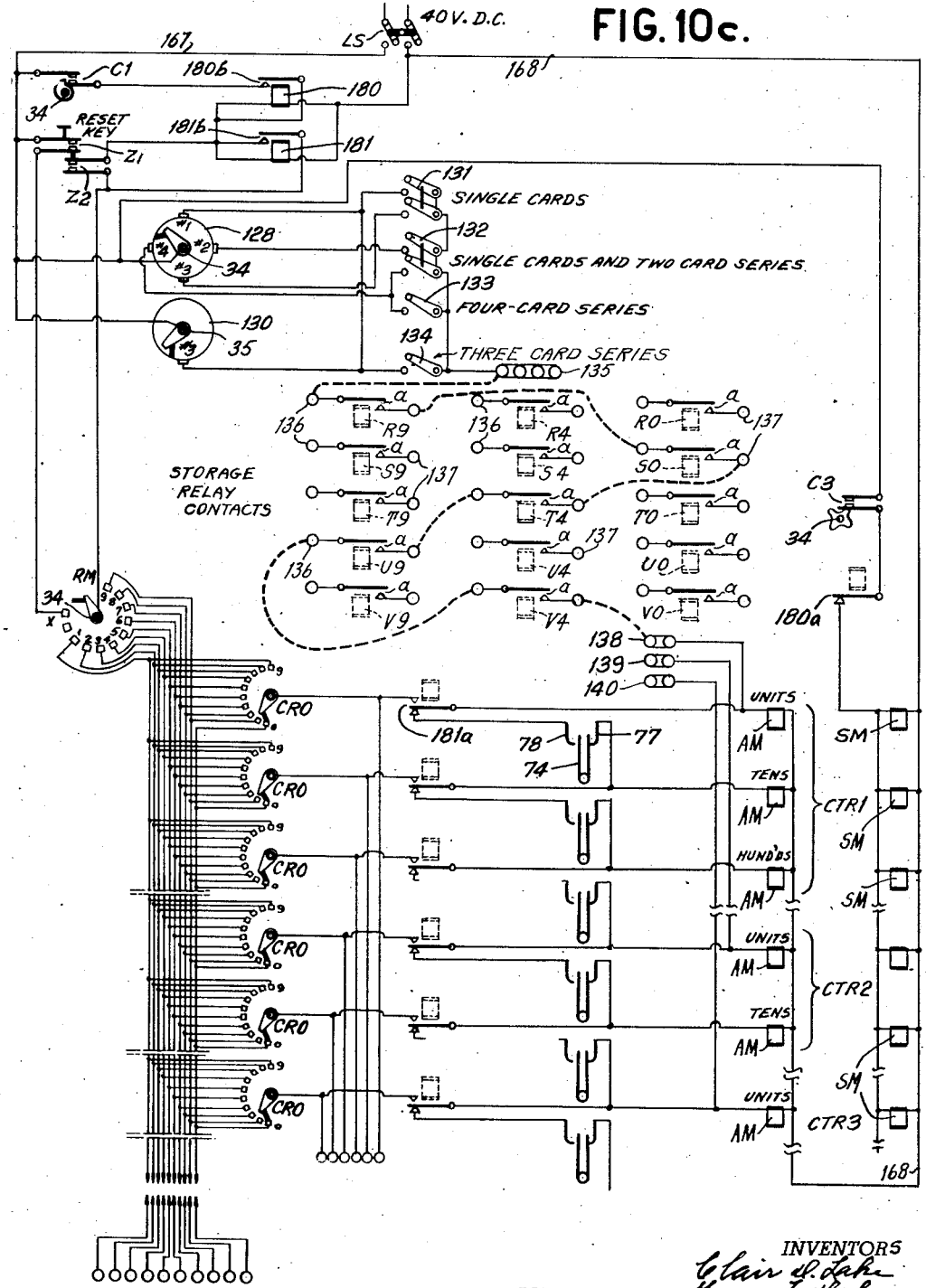

Patented May 8, 1945

2,375,307

UNITED STATES PATENT OFFICE 2,375,307

RECORD CONTROLLED MACHINE

Clair D. Lake, Binghamton, and George F. Daly, Endicott, N. Y., assignors to International Business Machines Corporation, New York, N. Y., a corporation of New York Application December 24, 1941, Serial No. 424,300

8 Claims. (Cl. 235—61.6)

This case relates to record-controlled machines and particularly to means therein to count statistical data such as pertains to a census.

The utility of a census is largely dependent upon the speed at which gathered statistics may be counted and tabulated. The census facts on records are counted by sending the records through a machine provided with counter structures. At most, only one increment of advance, equal to an increase in the count by "one" is effected by a counter bank for any one record passing through the machine.

In view of the foregoing, one of the objects of the invention is to feed the record cards at a higher speed than the counter structures may be advanced, this being possible because only one unit of advance of a counter structure is necessary, at most, while an entire record is fed through the machine.

Another object of the invention is to initiate a unit step of advance of a counter under control of a record while feeding at a speed greatly in excess of the actuating speed of the counter, and to interrupt counter advance by cyclical means before the next record may initiate the next step of counter advance.

Readout means are connected with the counter structures. The readout means in the present case is in the form of readout commutators. These are utilized, in a well known manner, to control the recording of the count. Further, the readout means are used herein to control resetting of the counters. Such resetting is effected during a machine cycle. This machine cycle is also the cycle of the actuating means for the counter. Thus, in a resetting cycle, the counter actuating means may be controlled to advance the counter from any position thereof to the zero position. On the other hand, during operation of the counters under control of the records, at least four such records may be passed through the machine during one machine cycle, since the actuating means for the counters will be required to advance a counter under control of the records only one value step for each record.

The machine counts occurrences of required facts designated on record cards. When the required facts are designated on single cards, the machine singly counts the number of cards bearing these facts. It has been found desirable in some cases to designate facts relating to a common subject on a series of cards rather than on one card. One reason is that the number of facts may be too great to be recorded on a single card. Another reason is that it is more convenient in some cases to subdivide the facts relating to a common subject into separate general classifications, with the facts of each classification recorded on a separate card. Thus, a census may be made of farm units in a district. The facts relating to each farm unit may include identification data, equipment data, and production data. It may be desired to tabulate each such classification of data separately for the entire district. When each class of data is designated on a separate card, the cards of the entire district may be passed through sorting means which will sort the cards into separate groups, each group containing the cards of one of the classifications. Each group may then be passed through a separate tabulating machine and separate tabulations concurrently obtained of each class of data for the entire county. Further, it may be desired to tabulate the facts relating to one particular class only, in which case only the group of cards of this class will be passed through a tabulating machine to the exclusion of the other groups. On the other hand, it may be desired to tabulate data of a plurality of the classifications, in which case a plurality of the card groups may be passed through one tabulating machine. It is obvious, therefore, that by recording different classifications of facts pertaining to a common subject on separate cards, a high degree of flexibility in handling the cards for statistical accounting purposes is obtainable.

One of the objects of the present invention is to provide means for counting combinations of facts designated on a plural card series. The principles of the invention as exemplified in the disclosed embodiment may be applied to the counting of series of any number of cards but, for convenience, the present machine is shown as adapted for the counting of two, three, or four-card series, in addition to being capable of counting cards singly bearing required data.

In general, the machine comprises means to sense the cards, one after another, while in motion, for required data designations. Circuits are closed at differential times of a card cycle under control of the sensing means and in accordance with the differential disposition along the card columns of the data designations. Data storage relays are selectively set up under control of these circuits. When the required data has been sensed on one or on a series of cards, depending on the preconditioning of the machine for the desired type of operation, the storage relays control counter actuating means to advance a counter one step. If the machine has been conditioned to count facts from single cards, it will tend to cause counter actuation each card cycle, but such actuation will not occur unless the required information is on the card sensed during the card cycle. If the machine has been conditioned to count card series, it will tend to cause counter actuation once each corresponding series of card cycles, but such actuation will occur only if the required combination of facts has been sensed on the cards of the series.

The counter structures used in this machine are of the type in which the actuating means is brought into toothed clutch engagement with a register wheel under control of an advance magnet, while clutch disengagement is brought about by energization of a stop magnet. The advance magnet may be energized under control of storage relays operated in accordance with the sensing of the selected items on the records. When a register wheel is thus clutched in, it performs a value advance at a rate which is a fraction of the rate at which the designation positions of a record cross a given point. Declutching of the register wheel is effected, after the register wheel has advanced one unit value step, by cyclical energization of the stop magnet at the proper time. Thus, the record sensing means sets up means to initiate a counting step which is performed independently of the feeding speed of the records but completed before the next counting step is initiated under control of the record sensing means.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a side view of one of the counter structures.

Fig. 3 is a section along lines 3—3 of Fig. 2.

Fig. 4 is an end view of the counter structure.

Fig. 5 is a section along lines 5—5 of Fig. 4.

Fig. 6 is a detail view, partly in section, and showing parts of Fig. 5 in alternate position.

Fig. 7 is a detail of carry control means of a counter structure.

Figure 8:
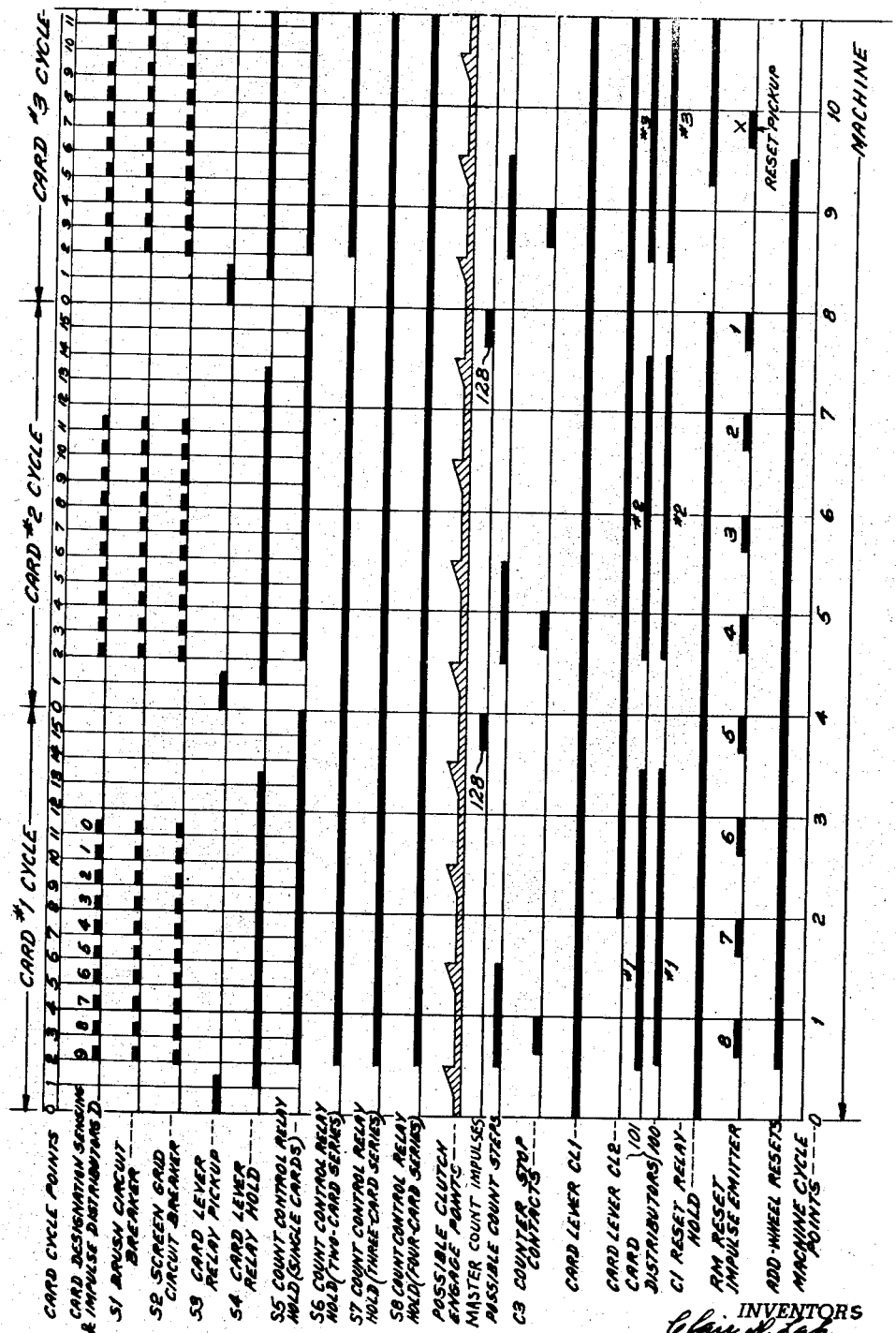

Figs. 8 and 8a constitute the timing chart.

Fig. 9 is a perspective view of a four-card series.

Figure 10A:
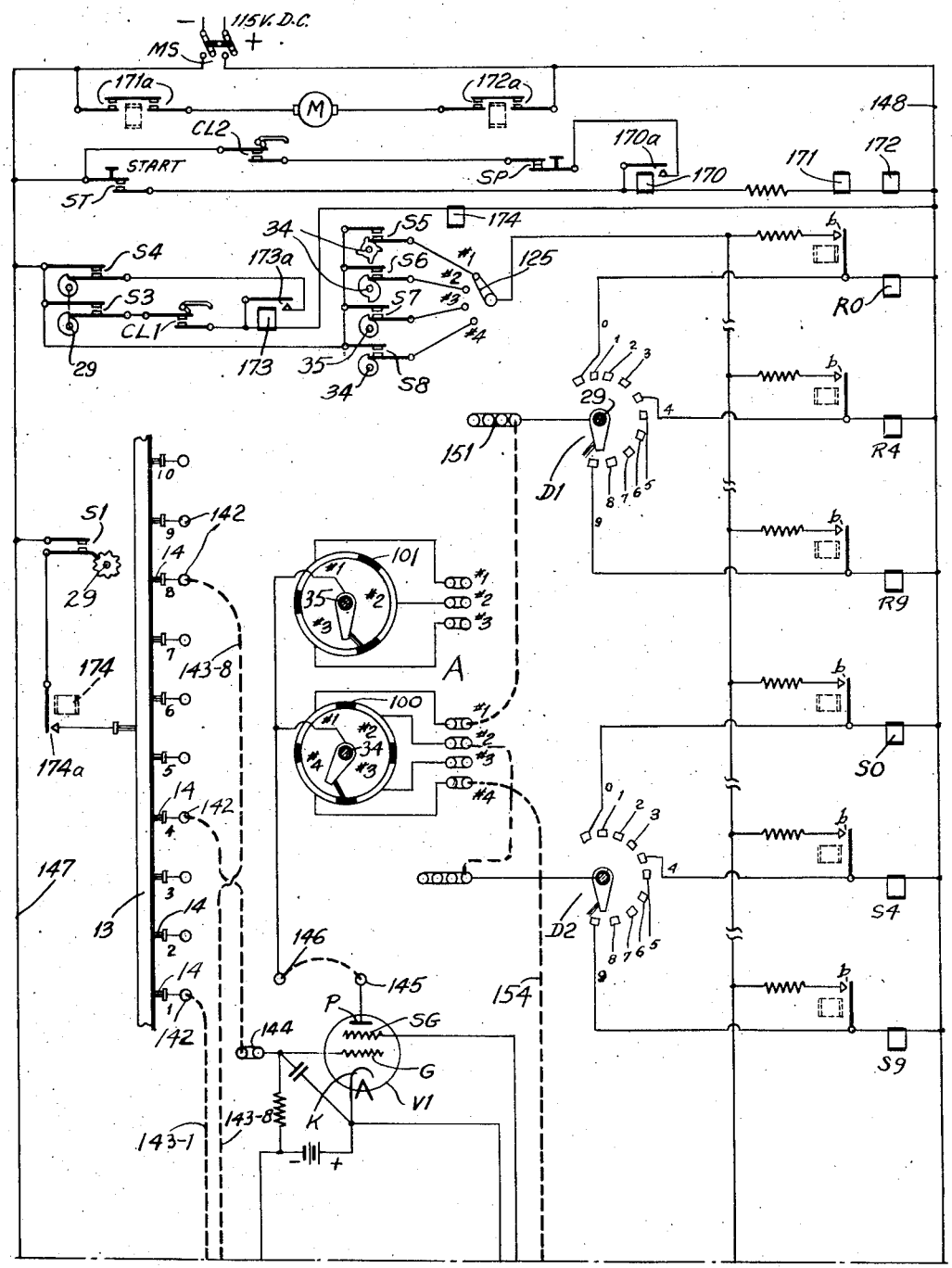
Figure 10B:
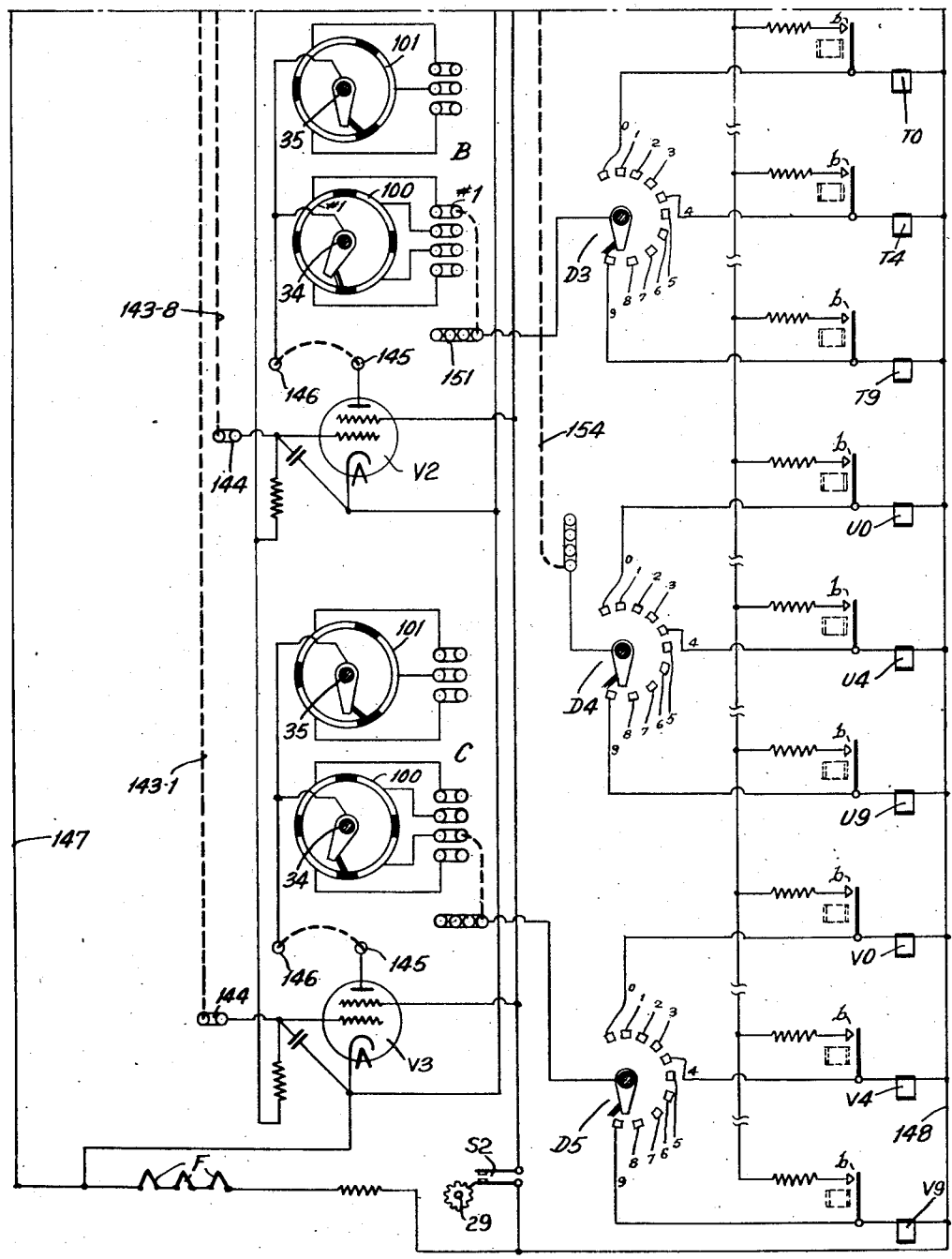

Figs. 10a, 10b, and 10c constitute the circuit diagram.

A detail description of the machine follows:

Card feed and drive means

Figure 1:
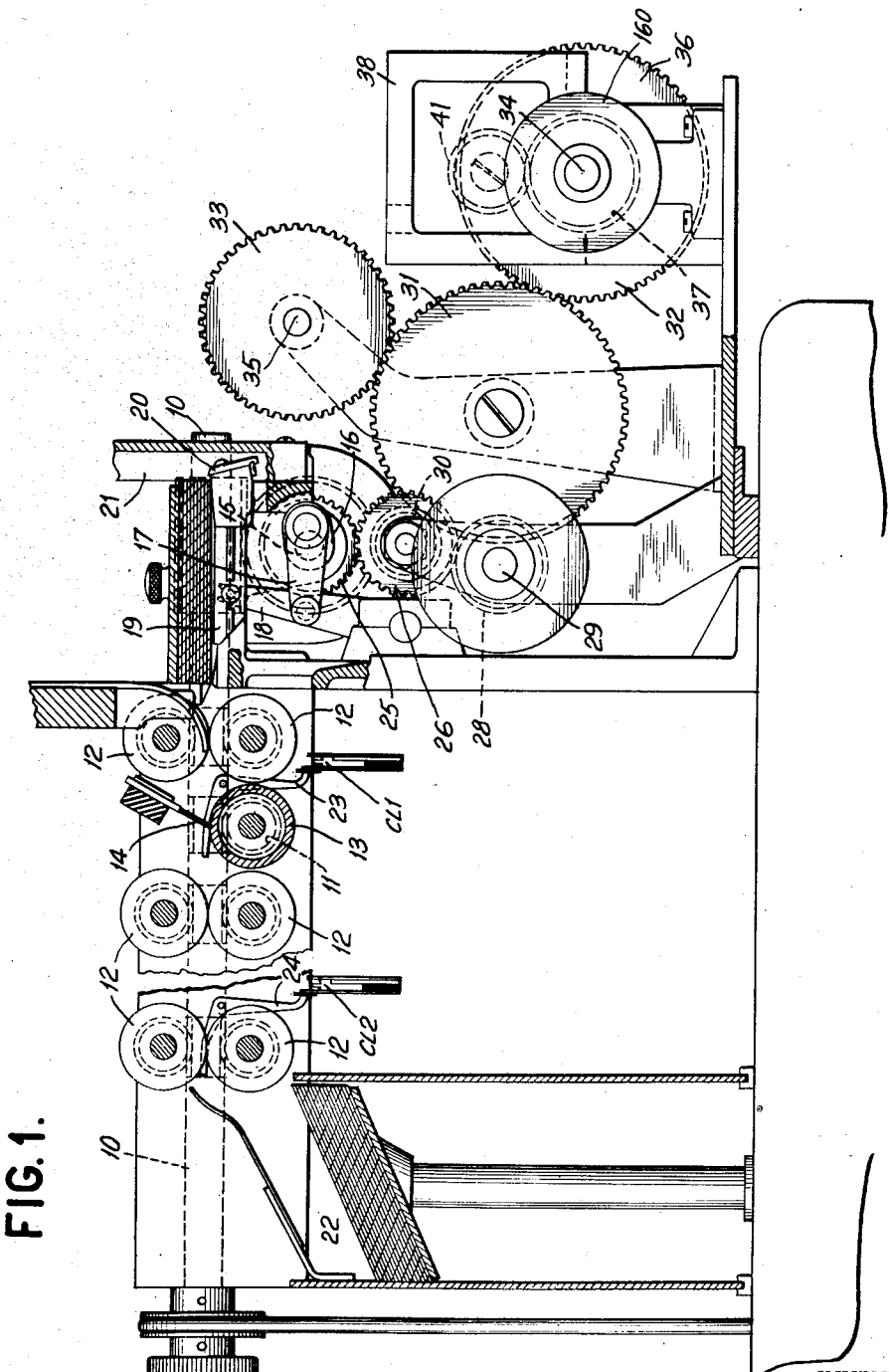
Fig. 1 is a vertical section through the card handling mechanism, showing also certain drive mechanism for the counters and for circuit controlling elements.

Referring to Fig. 1, a horizontal shaft 10 is driven by a motor M, shown diagrammatically in Fig. 10a. Shaft 10, through worm gearing, drives feed rolls 12 and a contact roll 13. A row of sensing brushes 14 coacts with common contact roll 13 to sense the designations in columns of a moving card. One brush is provided for each column to be sensed for designations. The brushes and contact roll comprise an electrical analyzer for cards.

Shaft 10, through worm gearing, also drives a crank shaft 15. This shaft has a crank arm 16 connected by a link 17 to a rocker arm 18 swiveled to a picker slide 19. Slide 19 carries a picker knife 20 which, upon the forward stroke of the slide, feeds the bottom card out of the supply hopper 21 to the first pair of feed rolls 12. These and the successive feed rolls continue the card feed uninterruptedly past the analyzing means and into a receiving pocket 22. As the card reaches the analyzing means, it acts on a card lever 23 to close card lever contacts CL1. A second card lever 24 is rocked by the card as it feeds to and through the third or final pair of feed rolls so as to close a second pair of card lever contacts CL2.

Crank shaft 15 serves through gears 25, 26 and 28 to drive a shaft 29. A pinion 30 rigid with gear 26 drives an idler 31. Idler 31 is meshed with gears 32 and 33 fast to shafts 34 and 35, respectively. The period between the arrival of like points of successive record cards at a given point of the card travel may be termed a card cycle (Figs. 8 and 8a). Shaft 15 makes one turn in each card cycle. The gear ratios are such that shaft 29 also makes one turn in a card cycle, shaft 34 makes one revolution in four card cycles, and shaft 35 makes one revolution in three card cycles. The revolution of shaft 34 may be referred to as the equivalent of a machine cycle (see Figs. 8 and 8a). Shafts 29, 34 and 35 carry contact-operating members and distributor brushes, omitted from Fig. 1 for the sake of clarity, but shown diagrammatically and appropriately identified in the circuit diagrams (Figs. 10a, b, and c).

Shaft 34 also serves as the counter drive shaft and for this purpose carries gears 37, each for driving one register order of counter structures mounted in a frame 38.

The counter (Figs. 2 to 7)

The counter has a plurality of orders, each individually mounted on a supporting plate 40. This plate is slidably insertable in frame 38 into a position in which a gear 41 of the order meshes with one of the drive gears 37. Gear 41 and a ratchet wheel 42 rigid therewith are rotatably carried by a sleeve 43 fixed to plate 40. Rotatably mounted on a hub portion of ratchet 42 is a disk 47 provided with ten teeth 47a. Sleeve 43 rotatably carries a register assembly comprising a register wheel 48 to which a carry cam 49 is fixed by studs 50 and 52. These studs extend through openings in disk 47 to positions adjacent ratchet wheel 42. Stud 50 pivots a clutch dog 53 connected by a spring 54 to stud 52 (see Fig. 5). Dog 53 has a clutch tooth 53a for engaging a tooth of ratchet wheel 42 to couple the register assembly thereto for drive. The clutch dog also is provided with a stud 53b coacting with a cam edge 47b of disk 47. Spring 54, acting through the clutch dog and its stud 53b tends to move disk 47 counterclockwise. Such movement is prevented when the tooth 55a of a clutch lever 55 is engaged with one of the teeth 47a of disk 47. When the disk is so held, as shown in Fig. 5, the cam edge 47b has its outer end engaging the stud 53b and, thereby, preventing the clutch dog from rocking inwardly into clutching coaction with the ratchet wheel 42. When the clutch lever 55 is rocked counterclockwise, its tooth 55a releases disk 47, permitting the clutch dog, under the influence of spring 54, to rock inwardly to engage its tooth 53a with a tooth of ratchet 42. The register assembly is thereby clutched to the drive gearing for rotation. As the clutch dog rocks inwardly, its stud 53b cams against edge 47b of disk 47 to rock the disk counterclockwise until its tooth 47a previously engaged by tooth 55a of the clutch lever is past the latter tooth. The parts then are in the positions shown in Fig. 6. The stud 53b, now at the inner end of the cam edge 47b of disk 47, serves to rotate the disk along with the now clutched-in register assembly.

To declutch the register assembly from the drive, clutch lever 55 is returned to upper position in which its tooth 55a intercepts a tooth 47a to stop the disk 47. The register assembly moves slightly further as the cam edge 47b cams stud 53b outwardly, thereby rocking clutch dog 53 clockwise to disengage it from the ratchet wheel 42. The parts are thus restored to their Fig. 5 positions.

Register wheel 48 has ten notches 48a, one for each of ten value positions. Engagement of a notch 48a with a spring-pressed detent 57 (Fig. 5) impositively holds and centers the register assembly in the value position to which it has been advanced.

Clutch lever 55 is pivotally connected to an armature lever 58 located between a magnet AM and a magnet SM. Magnet AM, upon energization, rocks lever 58 in a direction to cause clutch lever 55 to move counterclockwise and so release disk 47. As a result, the register assembly is clutched to the drive. Magnet SM, upon energization reverses the movements of levers 58 and 55, and lever 55 arrests the disk 47 to cause declutching of the register assembly. Magnet AM may be referred to as the advance magnet and magnet SM as the stop magnet. A latch 60 impositively holds the clutch lever in either of its alternate positions.

The value positions of the register assembly are manifested by a readout commutator generally designated CRO. The readout commutator comprises an insulating collar 65 fixed to the hub of register wheel 48 and provided with a conductive brush carrier 66. Brushes 67 and 68 carried by member 66 wipe value segments 0 to 9 and common segment K comprised of inserts imbedded in a molding 70 which is fastened to support plate 40. The brushes advance one-tenth of a revolution for each step of unit value advance of the register assembly. The segments 0 to 9 lie within half the circle of travel of the brushes and are spaced half the distance of a value step advance. For this reason, the brushes and commutator segments are so arranged that brush 67 engages value segments 0, 1, 2, 3, and 4 when the register assembly is in value positions 0, 1, 2, 3, and 4 and the brush 68 wipes common segment K while brush 68 engages value segments 5, 6, 7, 8, and 9 and brush 67 wipes the common segment when the register assembly is in value positions 5, 6, 7, 8, and 9. In moving from one value position to the next, a brush will pass from its previously engaged value segment across an intervening value segment and come to rest on the value segment corresponding to said next value position.

When a units order of the counter is advanced from 9 to 0 position, carry must be effected to the next higher order. The carry means comprises carry cam 49 and a follower lever 72 provided with a lug 72a which drops into a recess 49a when the register assembly is in "9" position (Fig. 7). Lever 72 carries an insulating piece 73 having a guide slot for the lower leg of a looped spring 74. The spring is looped around a projection 75 of a molding 76 and its upper leg is anchored to a terminal 77. When the register assembly is in positions 0 to 8, the lever 72 is in clockwise position (Fig. 5) and the lower leg of spring 74 is clear above a terminal 78. When the register assembly is in "9" position, the lever 72 is in counterclockwise position (Fig. 7) and the lower leg of spring 74 is engaged with terminal 78 which is thereby conductively connected by the spring to terminal 77. As will be explained later in connection with the circuits, the advance magnet AM of a higher order will receive a carry impulse via the conductively connected terminals 77 and 78 of the lower order, in "9" position, concurrently with transmission of an impulse to the magnet AM of the lower order to advance the latter order to "0" position. Thus, each time a lower order moves from "9" to "0," the next higher order is advanced one value step.

*Preliminary adjustments*

As indicated in Figs. 8 and 8a, there are four card cycles to one machine cycle. Thus, four cards will pass through the machine and be operated on during each machine cycle. The machine cycle is divided into sixteen points, one for each tooth of a gear 37 (Figs. 1 and 2). Gear 41 meshed therewith has ten teeth, and rotation of gear 37 through one-sixteenth of a revolution effects one-tenth of a turn of gear 41. Hence, when the register assembly is clutched to gear 41, it will be advanced one value step in one-sixteenth of the machine cycle; i. e., in one machine cycle point. The card cycle is also divided into sixteen points and the card is fed at such a speed that successive designation positions 9 to 0, 11, 12 (Fig. 9) pass the sensing brushes 14 during successive card cycle points. Thus, the card feeds four times as fast as the counter advances from one value position to the next, and the speed of card feed is not limited to the speed of operation of the counter.

As explained before, the machine may count required items designated on cards singly or may count required combinations of items designated on series of cards. According to the disclosed embodiment, such series may contain two, three, or four cards. Each card of a series bears a general classification of data different than the classification of data designated on the other card or cards of the same series. The different classification data cards of each series are arranged in the same predetermined order. When the machine is to operate on card series, a plurality of series are placed, one above another, in supply hopper 21 (Fig. 1).

The means for setting the machine to count required combinational data designated on two, three, or four-card series or to count data on individual cards includes pairs of commutators or distributors 100 and 101 diagrammatically shown in Figs. 10a and 10b. As many pairs of such distributors as desired may be provided. Three pairs are shown in Figs. 10a and 10b, identified for convenience, as pairs A, B, and C.

Distributor 100 has four contact segments marked #1, #2, #3, and #4. The brushes of distributors 100 are suitably fixed, through insulation, to machine cycle shaft 34 (Fig. 1) which is also the counter drive shaft. This shaft makes one revolution in four card cycles. Hence, four cards may pass the analyzing means 13—14 during one revolution of a brush of distributor 100. During this revolution, the distributor brush will wipe the segments #1, #2, #3, and #4 successively in synchronism with the passage of index points of four successive cards through the analyzing means.

Distributors 101 have three contact segments marked #1, #2, and #3. The brushes of distributors 101 are fixed, through insulation, to shaft 35 (Fig. 1). This shaft makes one revolution during three card cycles. Hence, the brushes of these distributors will wipe segments #1, #2 and #3 successively during the passage of index points of three successive cards through the analyzing means.

Distributors 100 and 101 may be referred to as card distributors. Plug sockets wired to the card distributor segments are designated, for convenience, correspondingly to the segments.

The card distributors may be selectively plugged to various impulse distributors generally designated D and further distinguished as D1, D2, D3, D4, and D5. The brushes of distributors D are fixed through insulation to shaft 29 (Fig. 1). This shaft makes one revolution each card cycle and the brushes wipe the contact segments of these distributors in synchronism with the passage of the index points of a card through the analyzing means. Any suitable member of the impulse distributors may be used. Five are shown in Figs. 10a and 10b and usually ten such distributors will be sufficient. The contact segments of the impulse distributor are wired to relay coils of item or indicia storage relays. Only three such coils are shown for each impulse distributor, but it will be understood that there are actually as many coils as impulse distributor segments. The relay coils associated with distributors D1, D2, D3, D4, and D5 are designated, respectively, R, S, T, U, V. Each coil is further differentiated by appending the value corresponding to the connected segment to the general designation of the set of relay coils in which the particular coil is included. As explained later, the relay coils are energized when corresponding item designations on the cards are sensed by the analyzing means. Holding circuits for the relay coils are then established. When the count is being made of items on single cards, the holding circuits will be maintained to the end of the card cycle in which the pickup circuits were established. When the count is being made of items on two-card series, the holding circuits will be maintained for two card cycles, and so on for three and four-card series. To adjust the period of maintenance of the holding circuits in accordance with the counting operation on cards singly or in series of two, three, or four cards, the operator preliminarily sets a switch blade 125 (Fig. 10a) to terminal 1, 2, 3, or 4. Terminals 1, 2, 3, and 4 are wired to cam contacts S5, S6, S7, and S8, respectively. Cam contacts S5, S6, and S8 are operated by cams fixed to shaft 34 which makes one revolution in four card cycles. Cam contacts S7 are operated by a cam fixed to shaft 35 which makes one revolution in three card cycles. Cam contacts S5 are operated by a four-lobe cam, so as to open at the end of each card cycle (see Figs. 8 and 8a). Cam contacts S6 are operated by a two-lobe cam so as to open every other card cycle. Cam contacts S7 are operated by a single lobe cam to open once every three card cycles, and cam contacts S8 are operated by a single lobe cam to open once every four card cycles. Thus, if the machine is to count items on cards taken one at a time, switch blade 125 is set at terminal 1. If the machine is to count items on a series of two cards, the blade 125 is set on terminal 2, and so on for three and four-card series.

The machine must be prepared to advance the counter or counters one unit step once each card cycle, or once every two card cycles, or once every three card cycles, or once every four card cycles according to whether the required items are to be sensed on cards singly or on two, three, or four-card series. For this purpose, means including commutators 129 and 130 (Fig. 10c) are provided. Commutator 129 has four segments marked #1, #2, #3, and #4. The brush of this commutator is fixed, through insulation, to shaft 34. Hence, this brush will engage the segments #1, #2, #3, and #4 during four successive card cycles at the times indicated along the line master count impulses in Figs. 8 and 8a. The commutator 130 has one segment marked #3 and the brush of this commutator is fixed, through insulation, to shaft 35. Hence, this brush will engage segment #3 once every three card cycles at the time indicated in card #3 cycle along the line master count impulses in Figs. 8 and 8a. Multiple switches 131, 132, 133, and 134 are associated with commutators 129 and 130. When the machine is to count items on cards singly, switches 131 and 132 are closed. When the machine is to count items on two-card series, switch 132 alone is closed. For counting items on four-card series, switch 133 is closed and for counting items on three-card series, switch 134 is closed. In accordance with the setting of these several switches, a master count impulse will be emitted once each card cycle or once every two, three or four such cycles.

The common side of switches 131, 132, 133, and 134 is wired to multiple plug sockets 135. Relay contacts a of item storage relay coils R, S, T, U and V are wired to plug sockets 136 and 137. Selected ones of these coils are intended to control counting operation according to the data to be counted. The sockets 136 and 137 of the relay contacts a of these preselected coils are connected in series by plug-wires to one of the sockets 135 which are wired to master count impulse switches 131 to 134. The last of the serially connected sockets 136 and 137 is connected by a plugwire to a socket 138, 139, or 140. The latter sockets are wired to the units order advance magnets AM of three counter banks CTR1, 2, and 3. It is to be understood that more of such counter banks are provided in actual practice but, for convenience, only three such banks are here indicated. Each counter bank may have as many orders as desired, three being shown for bank CTR1, two for CTR2, and one for CTR3. The machine may provide a plurality of separate counts of three different items or of three different sets of items by properly plugging the relay contacts a of the coils R, S, T, U and V between sockets 135 and 138, 139 and 140.

Referring to Fig. 10a, it will be noted that the sensing brushes 14 are wired to plug sockets 142. Plugwires 143 are connected between the sockets of the brushes 14 which sense the desired card columns and sockets 144 of vacuum tubes generally designated V. Plug sockets 144 are wired to the control grids G of the vacuum tubes. The plate P of each tube is wired to a socket 145 which may be connected by a plug wire to a socket 146 common to the brushes of a pair of distributors 100 and 101. The cathodes K of the tubes are connected to circuit line side 147, and the control grids are normally biased negative with respect to the cathodes. Each tube also includes a screen grid SG connected through a circuit breaker S2 (Fig. 10b) to current line 148. Fig 10b shows the filaments F of the tubes connected across the circuit lines. The vacuum tubes are not strictly necessary since the brush sockets may be plugged directly to sockets 146 of the distributor pairs A, B, C, and D. However, the use of the vacuum tubes is advantageous when the cards are fed at high speed since the impulses transmitted by sensing brushes may be amplified by the tubes and amplified current directed to the distributors to provide for more positive operation. For convenience of illustration, only three vacuum tubes are shown, though more will be used in actual practice. To facilitate the description, the tubes V may be distingushed as V1, V2, and V3.

Assume, for the present, that the machine is to handle four-card series, one of which is shown in Fig. 9. Each series relates to a different person, data on whom have been gathered in a population census. The cards of each series designate data of the following general classes:

*Card #1.*—Indentification.
*Card #2.*—Occupation.
*Card #3.*—Economic status.
*Card #4.*—Physical condition.

Card #1 may have columns assigned to name data, age data, nationality, etc. Card #2 may designate occupation, training, military experience, and so on. Card #3 may show whether the individual is a home owner or pays rent, whether he is regularly employed, his annual income, and the like. Card #4 might indicate the health of the individual, present and past, with a record of physical disabilities, time lost per year due to illness, and so on.

Assume that it is desired to count the occurrences of the following combinational data on cards #1, #2, #3 and #4 of each of a plurality of such four-card series:

*Card #1.*—Native born citizen, represented by a "9" hole in column 4, and between 26 and 30 years of age, designated by "4" in column 8.
*Card #2.*—Airplane pilot, represented by "0" in column 4.
*Card #3.*—Annual income between $5,000 and $6,000, designated by "4" in column 1.
*Card #4.*—No physical disabilities, designated by a "9" in column 4.

The combination of data designations to be searched for on each series may be tabulated as follows:

| Cards | Column 1 | Column 4 | Column 8 |
|---|---|---|---|
| #1 |  | "9" | "4" |
| #2 |  | "0" |  |
| #3 | "4" |  |  |
| #4 |  | "9" |  |

A plurality of such four-card series are placed one above another in supply magazine 21, each series having its cards #1, #2, #3 and #4 arranged in the stated order, so that card #1 will be sensed first, card #2 next, and so on.

Switch blade 125 (Fig. 10a) is set at switch point 4. Swith 133 (Fig. 10c) is closed.

To prepare the machine for storing item designations sensed in column 4 of card #1, the following plug connections are made:

A plugwire is connected between column 4 brush socket 142 (Fig. 10a) and socket 144 of tube V1. A plugwire is extended between socket 145 wired to the plate of tube V1 and the socket 146 common to the brushes of distributor pair A. Socket #1 of distributor 100 of pair A is connected by a plugwire to a socket 151 wired to the brush of impulse distributor D1.

By plugging column 4 brush socket 142 to vacuum tube V1, the sensing of a perforation by a brush 14 in this column will react on the tube. By further plugging the selected vacuum tube V1 to distributor 100 of pair A, the reaction of the tube to the sensing of a perforation in column 4 will be transmitted to this distributor. By further plugging socket #1 of this distributor 100 to distributor D1, the sensing of a perforation in column 4 of card #1 only of each series will react, through tube V1 and segment #1 of distributor 100 of pair A, upon distributor D1.

The plugging for preparing the machine to store designations sensed in column 8 of card #1 is as follows:

Column 8 brush socket 142 is connected by a plugwire 143—8 to the socket 144 of tube V2 (Fig. 10b). Socket 145 of tube V2 is plugged to socket 146 of distributor pair B. Socket #1 of distributor 100 of pair B is plugged to socket 151 of distributor D3.

To plug the machine for storing designations sensed in column 4 of card #2, the socket #2 of distributor 100 of pair A is plugged to distributor D2.

To plug the machine for storing designations sensed in column 1 of card #3, column 1 brush socket 142 is connected by a plugwire 143—1 to socket 144 of the tube V3 (Fig. 10b) which is plugged, in turn, to distributor pair C. Socket #3 of distributor 100 of pair C is plugged to distributor D5.

The machine is prepared for storing designations in column 4 of card #4 by connecting socket #4 of distributor 100 of pair A through plugwire 154 to distributor D4.

It is to be understood that the described plugging is merely illustrative and may be varied as desired. The essential requirement is that selected storage relay coils be energized as a result of the sensing of the combination of desired data on the cards of a series. In the illustrative case, relay coils R9, S0, T4, U9, and V4 will all be energized during the passage of a four-card series through the machine when the cards of this series bear the required combination of designations.

As shown in Fig. 10c the storage relay contacts *a* of coils R9, S0, T4, U9, and V4 are plugged up in series with one another and in series with a socket 135 of the master count impulse switch means and with socket 138 of counter bank CTR1. By the described plugging connections, a count impulse will be transmitted to the units order magnet AM of counter CTR1 only when all of the relays R9, S0, T4, U9, and V4 have been operated during the passage of a four-card series through the machine. These relays will all be operated only when the required data combination has been found on the cards of the series.

Before setting the machine in operation, the operator manually turns shaft 10 (Fig. 1) until an index mark on a wheel 160 fixed to shaft 34 is directly opposite a fixed index mark. By doing so, the various cams and the brushes of the various distributors and commutators are set in starting positions.

*Circuits and operation*

The machine is now ready to be set in operation. The operator closes switch MS (Fig. 10a) to place power on opposite, respectively minus and plus lines 147 and 148 and closes switch LS (Fig. 10c) to connect opposite lines 167 and 168 to a voltage supply.

The operator starts the machine by depressing a start key (Fig. 10a) to close contacts ST, completing a pick-up circuit through relay coils 170, 171, and 172. Coils 171 and 172 close contacts 171a and 172a to connect motor M to lines 147 and 148. The motor is thereby set running to operate shaft 10 (Fig. 1). During the first card cycle (the one in advance of the cycles shown in Fig. 8), card picker 20 (Fig. 1) feeds the bottom card from hopper 21 to the first pair of feed rolls. Intermediate this first card cycle, the first card operates card lever 23 to close card lever contacts CL1. At the end of the first card cycle, the leading edge of the first card is slightly behind the sensing brushes 14, while the brushes of distributors 100 have made a quarter of a revolution and those of distributor 101 have made a third of a revolution. At the beginning of the second card cycle (the one marked "card #1 cycle" in Fig. 8), cam contacts S3 close and together with now-closed contacts CL1 pick up relay coils 173 and 174 (Fig. 10a). Coil 173 closes its contacts 173a so that upon closure of cam contacts S4, a stick circuit is made through coils 173 and 174. At this point, the first index position "9" of the card is just about to reach the sensing brush line and the brushes of distributors 100 and 101 are about to move to the distributor segments #1. Further, coil 174 has now closed its contacts 174a to connect contact roll 13, via a circuit breaker S1 to circuit line 147. As the index positions of the first card pass the brushes 14 during the card #1 cycle, the brushes of distributors 100 and 101 wipe their segments #1 and the brushes of distributors D wipe their successive segments in synchronism with the passage of the index points of a card column through the analyzer.

As the first card passes through the analyzing means, it closes card lever contacts CL2 (Fig. 1). Closure of these contacts (refer to Fig. 10a) shunts the start key circuit through a path including stop key contacts SP and relay contacts 170a. The operator may now release the start key. The machine will continue to feed until the cards in the supply hopper are exhausted.

While the first card is passing through the analyzing means, the second card is feeding out of the hopper and before the first card leaves the lever 23, the second card engages the lever and keeps card lever contacts CL1 closed. Accordingly, the stick circuit of coils 173 and 174 which drops at the end of the record card cycle due to the opening of cam contacts S4 will make again during the next card cycle. In this manner, successive cards keep the card lever contacts closed to cause the circuits of coils 173 and 174 to be made each card cycle, beginning with the second (#1) card cycle. Successive cards also keep card lever contacts CL2 closed.

With the stack of cards in hopper 21 consisting of four-card series, the brushes of distributors 100 successively wipe their segments #1, #2, #3, and #4 during each set of four card cycles in which a series of four cards #1, #2, #3, and #4 is analyzed, one card after the other for the preselected combination of designations. Assume card #1 of a series has a "9" designation in column 4. The sensing of this designation by the brush 14 associated with card column 4 activates tube V1 to transmit an amplified impulse to the brush of distributor 100 of pair A (Fig. 10a). The impulse flows through segment #1 to socket #1 of this distributor, thence via plugwire to socket 151 of distributor D1. The impulse circuit continues via the brush of distributor D1 and its "9" segment, then engaged by the brush, to relay coil R9 which is thereby energized. Coil R9 thereupon closes its relay contacts R9b to establish a stick circuit extending via switch blade 125, terminal post 4, and cam contacts S8, to line 147. Cam contacts S8 remain closed until the end of the fourth card cycle of the series of such cycles in which cards #1, #2, #3, and #4 pass through the analyzing means.

Similarly, the sensing of the other preselected designations present on the cards of a series causes coils S0, T4, U9, and V4 to be picked up and held, maintaining their "a" contacts (Fig. 10c) closed. Shortly after the beginning of the 14th point of the fourth card cycle of a set or four such cycles in which the four-card series is analyzed, the brush of master count impulse emitter 128 (Fig. 10c) engages its contact segment #4 and emits a master count impulse (see Fig. 8a, card #4 cycle). This occurs after the analysis of all the index positions of card #4 has been completed. Upon engagement of the brush of emitter 128 with its segment #4, a circuit (Fig. 10c) is established from line 167 via the brush of emitter 128, its segment #4, and through switch 133 (preliminarily closed); thence via the plug connection between a socket 135 to socket 136 of relay contacts a of coil R9 and through the serially plug connected contacts a of coils S0, T4, U9 and V4 to socket 138. The circuit is completed through advance magnet AM of the units order of counter CTR1 to line 168.

Energization of magnet AM causes the register wheel 48 (Figs. 3 and 5) to be clutched to the drive means. One machine cycle point after the above circuit has been made, cam contacts C3 (Fig. 10c) close and complete a circuit via normally closed relay contacts 180a through the stop magnets SM of the counters. Accordingly, the clutched-in register wheel will be declutched and stopped after it has advanced one unit value step.

If the units order register wheel is at "9" value position at the time the related magnet AM receives the count impulse, a shunt circuit will extend from socket 138 via the normally closed side of a pair of relay contacts 181a to contact 78 (see also Fig. 7), thence via spring contact 74 to contact 77 and through the magnet AM of the tens order. In this manner, when the units order of a counter is at "9" value position at the time it receives a count impulse, a concurrent impulse will be transmitted to the tens order advance magnet. Under these conditions, each of these orders will advance one unit value step and the units order will thereby be set at "0" value position while the tens order will advance to its next value position. Further, if both the units order and tens order counters are at "9" positions, the count impulse will be transmitted not only to these orders but also the hundreds order of the counter, such hundreds order being shown only for counter 1.

The manner in which a counter is operated to count the number of four-card series bearing the required combination of data has been explained.

When the machine is to count the number of three-card series bearing combinations of required data, the distributors 100 are not utilized. Instead distributors 101 are used and sockets #1, #2, and #3 thereof plugged to various distributors D. The connections, including the vacuum tubes, between the brush sockets 142 and the card distributor pairs are made in the manner indicated before. Switch blade 125 (Fig. 10a) is set on terminal 3 and switch 134 (Fig. 10c) is closed. The operations are similar to those described for the four-card series except that now-active cam contacts S7 (Fig. 10a) will hold any energized storage relays operated for only three card cycles, and the brush of the supplementary master count impulse emitter 130 (Fig. 10c) will engage segment #3 to emit a master count impulse between the 14th and 15th point of the third card cycle of the set of three such cycles in which a three-card series is sensed (see Fig. 8a). The brushes of distributors 101 will wipe segments #1, #2 and #3 as cards #1, #2, and #3 of a three-card series are analyzed. Each time the required data is sensed on a three-card series, the counter will advance one unit step. For this mode of operation, card #4 cycle shown in Fig. 8a becomes the #1 card cycle for a new three-card series.

When the machine is to count two-card series, distributors 100 are used. Sockets #1 and #3 of such distributor are then plugged to each other and sockets #2 and #4 are also plugged to each other. The effect is the same as though a distributor D were replaced by a distributor with two contact segments successively wiped during two card cycles. In addition, switch blade 125 is set on terminal post 2 (Fig. 10a) to render cam contacts S6 effective. Further, switch 132 (Fig. 10c) is closed so that a master count impulse will be transmitted through the two poles of this switch when the brush of emitter 128 engages either of the segments #2 and #4. For this type of operation, the #3 and #4 card cycles shown in Figs. 8 and 8a becomes the #1 and #2 card cycles of a new two-card series.

When the machine is to count data on cards individually, all the sockets of either distributor 100 or 101 are plugged together. The effect of this is the same as though the utilized distributor were replaced by a distributor with one contact segment wiped by the related brush each card cycle. In addition, switch blade 125 (Fig. 10a) is set at post 1 to render cam contacts S5 effective. Further, switches 131 and 132 (Fig. 10c) are both closed. Closure of switch 131 places segments #1 and #3 of emitter 128 in the master count impulse circuit while switch 132 places segments #2 and #4 in the master count impulse circuit. Thus, a master count impulse may be emitted every card cycle. In this type of operation, the card cycles shown in Figs. 8 and 8a each relate to a single, separately considered record card.

Recording of a count may be effected in a well known manner by reading out the value registering positions of the readout commutators CRO (Fig. 10c).

After recording has been effected or after the count has been noted in any other manner, the counters may be reset to zero positions. Since it is assumed the cords have all been passed through the machine and the machine has consequently stopped, the operator first depresses the start key (Fig. 10a) to close the start key contacts ST. Accordingly, the machine will be set running for the reset operations. The start key is held down until reset has been completed. While holding the start key down, the operator depresses a reset key (Fig. 10c), closing key contacts Z1 and Z2. Closure of these key contacts is effective upon the brush of a reset emitter RM engaging a segment X of this emitter to establish a circuit from line 167 via contacts Z1, segment X, the brush, contacts Z2, and in parallel through coils 180 and 181 to line 168. Coils 180 and 181 are thus picked up at the time indicated in Fig. 8. At this time, cam contacts C1 have just closed and, consequently, a stick circuit for these coils is established as follows: from line 167 via cam contacts C1, relay contacts 180b, and in parallel through coils 180 and 181 to line 168. Coil 180 opens contacts 180a so that a circuit through stop magnets SM will not be established via cam contacts C3 until after cam contacts C1 open to drop coils 180 and 181. Coil 181 shifts contacts 181a so as to open their lower sides and close their upper sides. The carry circuit paths are opened by the breaking of the lower sides of contacts 181a. The upper sides of these contacts, upon closure, connect the brushes of readout commutators CRO of the several orders to their related advance magnets AM. Coil 181 also closes contacts 181b and with cam contacts C1 and relay contacts 180b also closed, the brush of reset emitter RM is connected to line 167 by a path extending from contacts C1 through cam contacts 180b and 181b in series. The segments 9 to 1 of emitter RM are wiped by the emitter brush at the times indicated in Figs. 8 and 8a. These segments 9 to 1 of the emitter RM are connected to the tens complementary value segments of readout commutators RO. Hence, if a readout commutator of a counter order has a brush on its segment 1, indicating a registration of 1 in this order, magnet AM of this order will be energized as the brush of emitter RM engages its 9 segment. The circuit for energizing magnet AM extends from line 167 via contacts C1, 180b, 181b, the emitter brush, the 9 segment of RM, the 1 segment of the readout commutator, the brushes thereof, the upper side of related contacts 181a, and through magnet AM to line 168. The energization of magnet AM at this time clutches the register wheel 48 to the drive means, and the register wheel will be continuously rotated for nine value steps from its 1 position to its 0 position where it is arrested due to being declutched from the drive means. The declutching of the register wheel is effected as a result of the following train of events: the opening of cam contacts C1, the consequent deenergization of coil 180, the reclosure of relay contacts 180a, and the closure of cam contacts C3 during the open interval of cam contacts C1. The closure of contacts C3 at this time is effective to establish the circuits of stop magnets SM.

Similarly, the other counter orders will be reset to zero by energization of their magnets AM via the mutually complementary segments of emitter RM and the readout commutators, followed by the energization of magnets SM.

While there has been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A machine for handling successive series of successively fed, individual records bearing item representations, comprising a counter, means to analyze the records for item representations, storage devices to store items, means coacting with the analyzing means to distribute items derived from successive records of such series to related storage devices to be stored thereby, means to clear the storage devices before the next series of records is analyzed, operating means for operating the counter to enter a unit value therein, and means controlled by the storage devices when storing a particular combination of items derived from a series of records for causing said operating means to be effective, whereby the counter counts the number of series of records bearing the particular combination of items.

2. A machine for handling successive record series, each of which may contain one or another known number of successively fed, individual records bearing item representations, comprising a counter, means to analyze the records for item representations, storage devices operable to store items, means coacting with the analyzing means to operate the storage devices to store items derived from a series of records and including distributor means between the analyzing means and the storage devices to distribute the items derived from successive records of the series to related storage devices to be stored thereby, entry means to operate the counter for entering a unit value therein, variably conditionable means conditioned, according to the known number of records in each series, to be effective under control of the storage devices when a particular set of items has been stored therein at the end of the analysis of a series of records for causing said entry means to enter a unit value in the counter, and variably conditionable means conditioned, according to the known number of records in each series, for clearing the storage devices before the first record of the next series is analyzed.

3. A machine for handling successive series of successively fed, separate records bearing item representations, comprising a counter, means to analyze the records, one after another, for item representations, storage devices operable to store items, means coacting with the analyzing means to operate the storage devices to store items derived from a series of analyzed records and including distributing means between the analyzing means and the storage devices for allocating items from successive records of the series to related ones of said storage devices, means to clear the storage devices before the next series of records is analyzed, entry means for operating the counter to enter a unit value therein, and means controlled by the storage devices when a particular set of items from a series of records has been stored thereby for causing said entry means to be effective to enter a unit value in the counter, whereby the counter receives a unit value entry for each series of records bearing the particular items.

4. A machine for handling successive record series, each of which may contain one or another known number of records bearing item representations, comprising means to analyze the records, one after another, for item representations, storage devices operable to store items, means coacting with the analyzing means to operate the storage devices to store indicia derived from a series of records and including variably conditionable distributing means conditioned according to the known number of records in each series for allocating items derived from successive records of a series of related ones of said storage devices, variably conditionable clearing means for the storage devices conditioned according to the number of records in each series to clear the storage devices after a series of records has been analyzed and before analysis of the next series, entry means for operating the counter to enter a unit value therein, and means conditionable according to the number of records in a series to be effective under control of the storage devices only when a particular set of items from a series of said number of records has been stored therein for causing the entry means to enter a unit value in the counter, whereby the counter counts the number of such record series bearing the particular set of items.

5. A machine for handling successive series of records bearing item designations, comprising means for analyzing the records, one after another, for designations, item storage relays each including contacts closed upon operation of the related relay to manifest storage of an item, circuit means controlled by the analyzing means in response to designations on the records to operate related storage relays so as to cause closure of the related contacts to manifest the corresponding items and including electrical distributing connections for causing the designations of successive records of the series to affect different ones of the storage relays, a counter, means for entering a unit value in the counter including an electrical entry control device, a circuit therefor including switching means closed once for each series of records analyzed, with such closure occurring after the analysis of all the records of the series, and including also, in series, the storage relay contacts corresponding to a particular set of items, whereby said circuit is closed only when the particular set of items is designated on an analyzed series of records so as to cause the counter to receive a unit value entry for each such series of records, and means to restore the relays to unoperated condition after said switching means has closed to perform its function and before analysis of the first record of the next series.

6. A machine for handling successive series of records bearing item designations, with each record having designation positions differentially disposed thereon, comprising means for feeding the records, means for sensing the designation positions of a record in succession while the record is feeding past the sensing means and circuits controlled thereby and including, in combination, a distributor operatively connected to the sensing means and having successive segments and a brush for wiping the segments successively in synchronism with the sensing of successive records of each series, impulse distributors, each operatively connected to one of said circuit segments, and having successive circuit closing elements effective in synchronism with the successive sensing of the designation positions of each record, item storage relays including coils connected to the circuit closing elements of each impulse distributor, whereby the circuit controlled by the sensing of a designation in each record of a series is routed through the first named distributor to a different one of the impulse distributors for each different record of the series and further routed through this impulse distributor to the storage relay coil connected to the circuit closing element corresponding to the designation being sensed so as to cause energization of this coil, stick circuits for the energized coils, value entry receiving means, and means for causing value entry therein under conjoint control of the coils corresponding to a set of particular items derived from a series of records provided the latter coils have all been energized, and means for opening said stick circuits before the sensing of the next series of records, whereby value entry occurs for each series of records bearing designations of the particular set of items.

7. A machine for handling successive series of records bearing item designations, comprising means for analyzing the records, one after another, while in motion, for designations, item storage relays, each including contacts closed upon operation of the related relay to manifest storage of an item, circuits closed under control of the analyzing means in response to designations on successive records of a said series to operate related storage relays according to the designations on the successive records of the series so as to cause closure of the related contacts to manifest the corresponding items, said circuits including a distributing commutator having a plurality of circuit routing contact elements and a coacting contactor, means for effecting relative movement between the contactor and elements in synchronism with the movement of the records, each of said elements being of a length to engage with the contact during analysis of one record of the series, and said elements being so spaced as to engage with the contactor in succession during analysis of successive records of the series so as to route the circuit or circuits related to designations on each different record of the series to a related one or to related ones of the storage relays.

8. A machine such as defined in claim 7, and means whereby two or more of the circuit routing elements may be connected in parallel to reduce the routing capacity of the distributor correspondingly to a reduction in the number of records in each series.

CLAIR D. LAKE.
GEORGE F. DALY.